Oct. 20, 1931.                M. J. MATTHEWS                1,827,795
COLLET
Filed March 12, 1930                    2 Sheets-Sheet 1
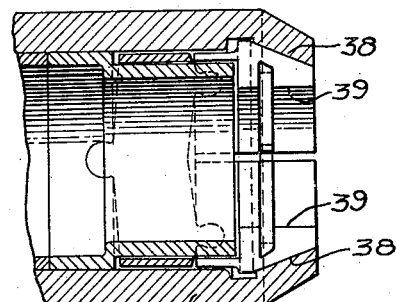
Fig. 1.
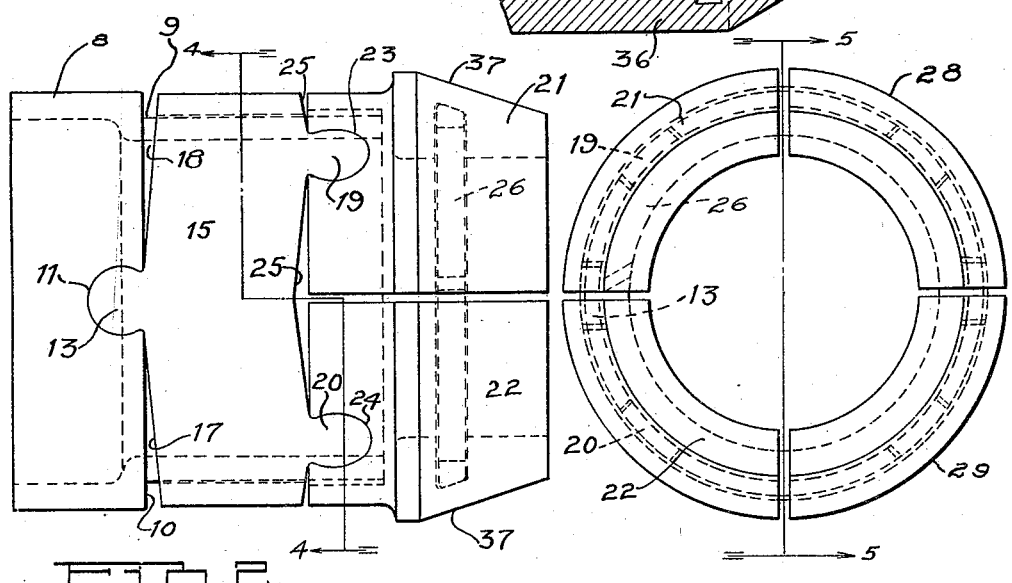
Fig. 2.                                    Fig. 3.
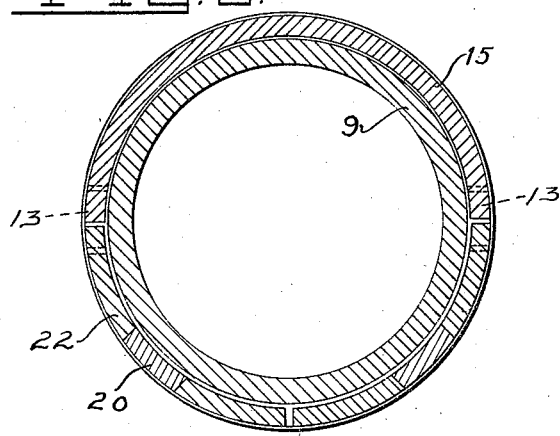
Fig. 4.
INVENTOR
Milton J. Matthews.
BY
Harness, Dickey, Pierce & Hann,
ATTORNEYS.

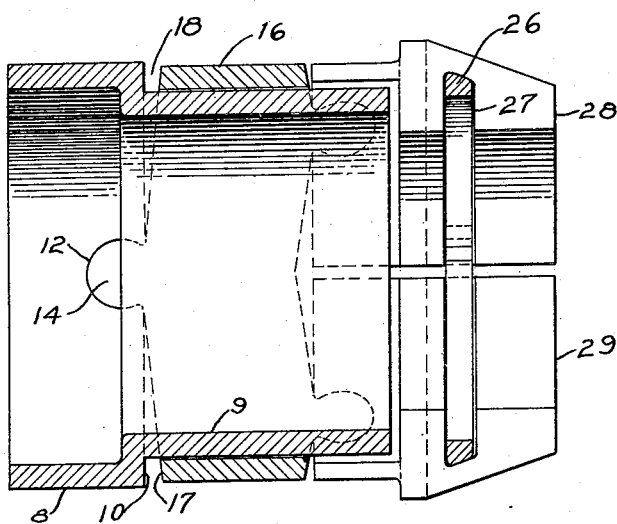
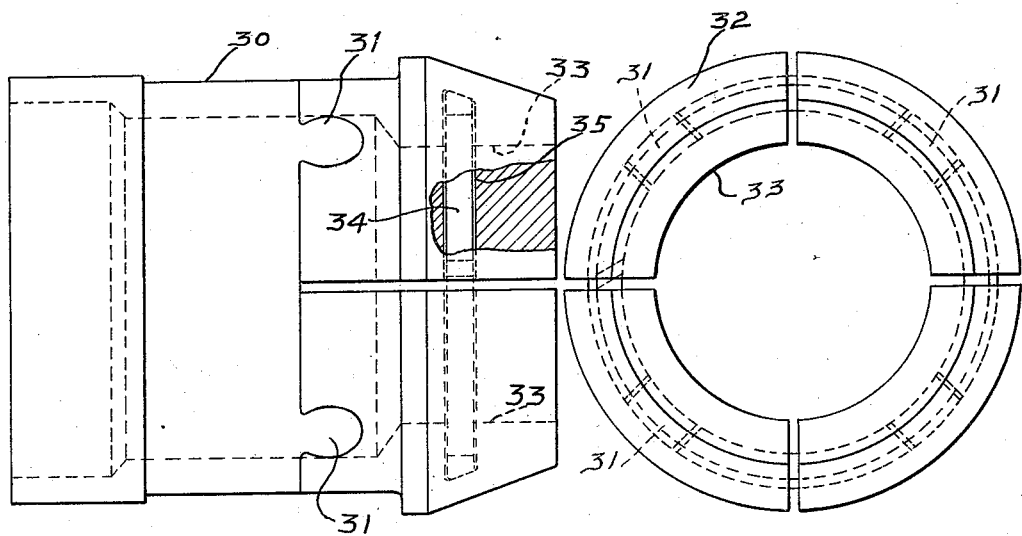

Patented Oct. 20, 1931

1,827,795

UNITED STATES PATENT OFFICE

MILTON J. MATTHEWS, OF DETROIT, MICHIGAN

COLLET

Application filed March 12, 1930. Serial No. 435,147.

This invention relates to collets.

The main objects of this invention are to provide an improved form of collet which will securely grip material placed therein; to provide a collet in which jaws are movable in such a manner as to compensate for variations in the material stock placed therein; to provide an improved form of collet in which the inner faces of the gripping jaws are maintained in parallel relation to each other and to the exterior surfaces of the stock material at all times; to provide an improved construction of collet in which the jaws will more securely grip the stock material with less pressure exerted on the collet jaws than has heretofore been possible; and to provide a collet which will with equal efficiency grip a wide range of diameters of stock material.

An illustrative embodiment of this invention is shown in the accompanying drawings, in which:

Fig. 1 is a fragmentary longitudinal sectional view of my improved collet mounted in a spindle.

Fig. 2 is an enlarged view in longitudinal elevation of my improved construction of collet.

Fig. 3 is a front end view of the same.

Fig. 4 is a sectional view taken on the line 4—4 of Fig. 2, looking in the direction indicated by the arrows.

Fig. 5 is a sectional view taken on the line 5—5 of Fig. 3, looking in the direction indicated by the arrows.

Fig. 6 is a view in side elevation of a modified form of collet with a portion thereof broken away to show the interior construction.

Fig. 7 is a front end view of the same.

Heretofore in the construction of collets, it has been customary to take a piece of tubular material and cut axially extending slots, usually at right angles to each other, with the intersection at the longitudinal axis of the device, said slots extending inwardly from one end of the collet.

This construction provides four portions of equal size, integrally extending axially from the base shank. The outer ends of these portions are beveled so that when either drawn into a spindle or pushed outwardly in the spindle, depending upon the direction of the bevel, the split tongue portions of the collet are sprung inwardly to grip the bar of stock material placed therein.

By reason of these portions, which are usually termed jaws, being integrally formed on the base shank, they swing through the arc of a circle, the radius of which is substantially the depth of the slots cut in the collet. With this kind of a movement it is obvious that there can be only one point at which the gripping faces of all four jaws will be parallel to each other, and parallel to the outer surface of the stock material placed therein. Any variation of size in the stock material from this one exact point will cause the inner faces of the collet jaws to become out of parallel with each other, so that the entire face will not evenly and uniformly grip the surface of the stock material placed therein. With such type of collet it is necessary to exert great pressure on the collet in order that it will grip the bar of stock material with sufficient security.

With my improved construction of collet the gripping jaws are mounted so as to have true radial movement bodily with the gripping faces of the jaws maintained in parallel at all times, so that the entire face of the jaw will evenly and uniformly grip the bar of stock material.

Another difficulty which has been experienced with prior art collets has been where the bar of stock material is slightly out of round. In such instances two jaws only of the collet will grip the bar of stock material and the other two will not exert any appreciable gripping action on the stock.

In the preferred form of my improved construction, this objection has been overcome by providing means for axial movement or shifting of the gripping jaws, so that the two jaws gripping the bar of stock material where its cross-section is the greatest will slightly recede from the beveled end of the spindle and the two opposite jaws will slightly advance. The arrangement is such that the movement is equalized, and all four jaws will contact with the beveled end of the spindle with equal resistance and will grip the bar of stock material with equal pressure.

In the construction shown in the drawings, a tubular shank member 8 is provided with a portion 9 of reduced diameter at one end thereof, thus providing a shoulder 10 at the point where the diameters change. The shank 8 at diametrically opposite sides and adjacent to the shoulder 10 is provided with substantially annular sockets 11 and 12 in which are pivoted trunnions 13 and 14 respectively, of a pair of semi-circular intermediate members or sleeves 15 and 16 respectively.

The sleeves 15 and 16 loosely surround or embrace the reduced portion 9 of the shank member, and the edges thereof adjacent to the shoulder 10 are cut away as shown at 17 and 18, so as to provide clearance with respect to the shoulder 10, and thus permit rocking of the members on the pivoted trunnions, which trunnions are positioned substantially medially of their respective members.

Each of the intermediate members 15 and 16 is provided with axially extending substantially annular trunnions 19 and 20, the side walls of which extend radially with respect to the longitudinal axis of the shank 8. Jaw members 21 and 22 are provided with complementary sockets 23 and 24 respectively for fitting upon the trunnions 19 and 20, thus providing interfitting connections which permit radial sliding movement of the jaws 20 and 21. The end of the intermediate member 15 adjacent the jaws 21 and 22 is also cut away as shown at 25 to provide clearance so that the jaws have limited rocking action on their trunnions as well as radial sliding movement.

A similar pair of jaw members 28 and 29 are mounted in the same manner upon the intermediate member 16, so that the four jaws complete the device, two being mounted on each of the intermediate members.

The axis of the arcuate socket and trunnion, as clearly evident from Fig. 3, substantially coincides with a radius of the shank member, and hence of the jaws. The limited rocking movement of the jaws on their trunnions, then occurs respectively, in planes substantially perpendicular to each radii. Hence the jaws can move radially toward the axis of the shank member and jaws, and turn in planes respectively perpendicular to such radii, thereby permitting accurate adjustment of the jaws with respect to a work piece between them.

Means are provided for normally urging the jaws outwardly in a radial direction, and comprise a split ring 26 of spring material mounted in a circumferentially extending groove 27 formed in the inner faces of the jaw members.

In the modified form of construction shown in Figs. 6 and 7 of the drawings, a tubular shank member 30 is provided with four trunnions 31, equidistantly spaced therearound, the side walls of which extend radially with respect to the longitudinal axis of the shank. Four jaw members 32, all of the same construction, are mounted upon the trunnions 31 so as to be radially movable with the jaw faces 33 in parallel relationship at all times. A split ring of spring material 34 is provided in a circumferentially extending groove 35 for normally urging the jaws outwardly so as to receive a bar of stock material therein.

In the operation of this collet it is placed in a spindle 36 and when moved outwardly relatively to the spindle, the outer sloping faces 37 of the jaw members contact with the complementary beveled face 38 of the spindle, thus camming the jaw members inwardly to grip the bar of stock material placed therein. The jaw members slide on their respective trunnion so that the gripping faces 39 are maintained in parallel relation at all times.

If the bar of stock material is slightly out of round so that its cross-sectional measurement at one diameter is greater than at another, the two opposite jaw members which engage the large part of the bar will recede inwardly by reason of the rocking action of the intermediate members 15 and 16. The rocking of these intermediate members will carry the opposite jaw mounted on each intermediate member outwardly, so that all four jaws will contact with the same pressure against the beveled face of the spindle. In this manner, all four jaws will be forced inwardly to grip the bar of stock material with the same pressure, this pressure being equalized by the intermediate members 15 and 16.

By reason of the gripping faces of the jaws being maintained parallel to the surface of the bar of stock material, the jaws will evenly and uniformly grip the bar of stock and securely hold the same with considerably less pressure being exerted upon the collet than has heretofore been required with the standard form hereinabove mentioned.

Although but one specific embodiment and one modification of this invention have been herein shown and described, it will be understood that numerous details of the constructions shown may be altered or omitted without departing from the spirit of this invention, as defined by the following claims.

I claim:

1. An equalizing collet comprising a shank member, intermediate members rockably mounted on said shank member and a plurality of jaw members radially slidable on said intermediate members.

2. An equalizing collet comprising a shank member, intermediate members rockably mounted on said shank member, a plurality of jaw members and radially extending, inter-fitting portions on said intermediate and jaw members for slidably supporting said jaw members.

3. An equalizing collet comprising a shank member, a pair of intermediate members rockably mounted on said shank member and a pair of jaw members radially slidable on each of said intermediate members.

4. An equalizing collet comprising a shank member, a pair of intermediate members rockably mounted on said shank member, a pair of jaw members radially slidable on each of said intermediate members, and means for urging said jaws outwardly.

5. An equalizing collet comprising a shank member, intermediate members rockably mounted on said shank member, a plurality of jaw members radially slidable on said intermediate members, said jaws having a circumferentially extending groove in their inner faces and a ring of spring material in said groove for urging said jaws outwardly.

6. An equalizing collet comprising a tubular shank member having a portion of less outside diameter on one end thereof, a pair of semi-circular intermediate members rockably mounted at their medial points on said shank member, said intermediate members surrounding said smaller portion in loose-fitting relationship, and a plurality of jaw members radially slidable on said intermediate members.

7. An equalizing collet comprising a tubular shank member having a portion of less outside diameter on one end thereof, a pair of semi-circular intermediate members rockably mounted at their medial points on said shank member, said intermediate members surrounding said smaller portion in loose-fitting relationship, a plurality of jaw members and radially extending, inter-fitting portions on said intermediate and jaw members for slidably supporting said jaw members.

8. An equalizing collet comprising a tubular shank member having a portion of less outside diameter on one end thereof, a pair of semi-circular intermediate members rockably mounted at their medial points on said shank member, said intermediate members surrounding said smaller portion in loose-fitting relationship, a plurality of jaw members, radially extending, inter-fitting portions on said intermediate and jaw members for slidably supporting said jaw members, said jaws having a circumferentially extending groove in their inner faces and a ring of spring material in said groove for urging said jaws outwardly.

9. An equalizing collet comprising a tubular shank member, a pair of circumferentially extending intermediate members rockably mounted at their medial points on the shank member and having substantially radial axes of rocking movement, and a plurality of jaw members rockably mounted on the intermediate members.

10. An equalizing collet comprising a tubular shank member, a pair of circumferentially extending intermediate members rockably mounted at their medial points on the shank member and having substantially radial axes of rocking movement, and a plurality of jaw members rockably mounted on the intermediate members, and having substantially radial axes of rocking movement.

11. An equalizing collet comprising a tubular shank member, a pair of circumferentially extending intermediate members rockably mounted at substantially their medial points from the shank member and having substantially radial axes of rocking movement, and a plurality of jaw members rockably mounted on the intermediate member, and having substantially radial axes of rocking movement, said jaw members also being radially slidable relative to the intermediate members.

12. An equalizing collet comprising a tubular shank member, a pair of circumferentially extending intermediate members rockably mounted at substantially their medial points on the shank member and having substantially radial axes of rocking movement, and a plurality of jaw members relatively mounted on the intermediate members, each intermediate member rockably supporting a pair of the jaw members.

13. A collet comprising a supporting device, and a plurality of circumferentially spaced jaw members at one end of the supporting device, each of the jaw members and the supporting device having interfitting, arcuate surfaces, the axis of which extends toward the longitudinal center line of the jaws, the jaw members being rockable about such axes.

14. A collet comprising a supporting device, and a plurality of circumferentially spaced jaw members at one end of the supporting device, each of the jaw members and the supporting device having interfitting arcuate surfaces, the axis of which extends toward the longitudinal center line of the jaws, the jaw members being rockable about such axes, and slidable along the arcuate surfaces of the supporting device toward or away from said center line.

15. A collet comprising a supporting device, a plurality of circumferentially spaced jaw members at one end of the supporting device, and means connecting each jaw member to the supporting device, said connection including an arcuate socket formed in one of the connected parts, the axis of which extends toward the axis of the jaw members, and a trunnion on the other part which is disposed in said socket, whereby the jaw members have rocking movement about the axes of the sockets.

16. A collet comprising a supporting device, a plurality of circumferentially spaced jaw members at one end of the supporting device, and means connecting each jaw member to the supporting device, said connection including an arcuate socket formed in one of the connected parts, the axis of which extends toward the axis of the jaw members, and a trunnion on the other part which is disposed in said socket, and which is slidable in said socket toward the axis of the jaws, whereby the jaw members have rocking movement about the axes of the socket and sliding movement along said axes.

17. A collet comprising a supporting device, a plurality of jaw members arranged in circumferentially spaced relation at one end of the supporting device, and means connecting each jaw member to the supporting device for rocking movement about an axis substantially perpendicular to and substantially intersecting the axis of the jaw members, and sliding movement along the first axis.

MILTON J. MATTHEWS.